United States Patent
Nath et al.

(10) Patent No.: US 11,424,851 B2
(45) Date of Patent: Aug. 23, 2022

(54) DYNAMIC BIT WIDTH DETERMINATION FOR RESOURCE BLOCK GROUP MASK

(71) Applicant: QUALCOMM Incorporated, San Diego, CA (US)

(72) Inventors: Sudeepta Kumar Nath, Sambalpur (IN); Tushar Singh, Hyderabad (IN); Ashok Kumar Tripathi, Pragathi Enclave (IN); Anil Kumar Devpura, Hyderabad (IN); Loksiva Paruchuri, Hyderabad (IN); Satish Kumar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/116,007

(22) Filed: Dec. 9, 2020

(65) Prior Publication Data
US 2022/0182172 A1     Jun. 9, 2022

(51) Int. Cl.
*H04L 1/00*    (2006.01)

(52) U.S. Cl.
CPC .......... *H04L 1/0008* (2013.01); *H04L 1/0009* (2013.01)

(58) Field of Classification Search
CPC ............................ H04L 1/0008; H04L 1/0009
See application file for complete search history.

(56) References Cited

U.S. PATENT DOCUMENTS

| | | | |
|---|---|---|---|
| 2011/0274076 A1* | 11/2011 | Glasson | H04L 5/0064 370/329 |
| 2013/0070692 A1* | 3/2013 | Miki | H04L 5/001 370/329 |
| 2014/0029537 A1* | 1/2014 | Golitschek Edler von Elbwart | H04L 5/0094 370/329 |
| 2014/0204879 A1* | 7/2014 | Yang | H04W 72/0413 370/329 |
| 2014/0293937 A1* | 10/2014 | Lee | H04W 72/0406 370/329 |
| 2016/0100382 A1* | 4/2016 | He | H04W 72/042 370/329 |

(Continued)

FOREIGN PATENT DOCUMENTS

| | | | | |
|---|---|---|---|---|
| WO | WO-2021003278 A1 * | 1/2021 | ........ | H04W 72/0413 |
| WO | WO-2021152629 A1 * | 8/2021 | ............ | H04W 16/14 |
| WO | WO-2021162573 A1 * | 8/2021 | .......... | H04W 88/085 |

*Primary Examiner* — Ivan O Latorre
(74) *Attorney, Agent, or Firm* — Holland & Hart LLP

(57) ABSTRACT

Methods, systems, and devices for wireless communications are described. Some wireless communications network may operate in accordance with an open-RAN (ORAN) network specification which may support functional splitting between the ORAN distributed unit (O-DU) and the ORAN radio unit (RU) located at a base station. The O-DU may communicate with the O-RU using control messaging, and the O-DU may signal whether various resource block groups are used for data allocation by enabling or disabling bits in a bit mask parameter in a header of the control message. To increase communications efficiency and reduce overhead, the O-DU may dynamically configure the number of bits included in a bit mask based on a radio access technology (RAT) type. The O-DU may determine the size of the bit mask in the control message based on the RAT type and may generate the control message that includes the bit mask.

30 Claims, 11 Drawing Sheets

(56) References Cited

U.S. PATENT DOCUMENTS

| | | | |
|---|---|---|---|
| 2017/0078126 A1* | 3/2017 | Einhaus | H04W 72/042 |
| 2018/0070339 A1* | 3/2018 | Horiuchi | H04L 5/0048 |
| 2019/0239198 A1* | 8/2019 | Zhang | H04W 72/04 |
| 2019/0260548 A1* | 8/2019 | Parkvall | H04W 72/042 |
| 2019/0261331 A1* | 8/2019 | Guth | H04L 5/0094 |
| 2020/0059390 A1* | 2/2020 | Zhang | H04L 1/0004 |
| 2021/0120531 A1* | 4/2021 | Jeon | H04B 7/0691 |
| 2021/0120576 A1* | 4/2021 | Shen | H04L 5/001 |
| 2021/0126756 A1* | 4/2021 | Horiuchi | H04L 5/0053 |
| 2021/0135722 A1* | 5/2021 | Ahmed | H04W 72/04 |
| 2021/0234648 A1* | 7/2021 | Parekh | H04L 5/0032 |
| 2021/0235277 A1* | 7/2021 | Parekh | H04W 24/10 |
| 2021/0235323 A1* | 7/2021 | Parekh | H04W 72/04 |
| 2021/0242999 A1* | 8/2021 | Baskaran | H04L 27/2602 |

* cited by examiner

DYNAMIC BIT WIDTH DETERMINATION FOR RESOURCE BLOCK GROUP MASK

FIELD OF TECHNOLOGY

The following relates to wireless communications, including dynamic bit width determination for resource block group mask.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications networks may support an open radio access network (ORAN) architecture to interoperability between devices and systems. Some signaling techniques supporting the ORAN architecture, however, may be deficient.

SUMMARY

The described techniques relate to improved methods, systems, devices, and apparatuses that support dynamic bit width determination for resource block group mask. Generally, the described techniques provide for efficient interoperability between wireless communications devices associated with a multivendor RAN, a wireless communications network may operate in accordance with an open-RAN (ORAN) network specification. ORAN operation may reduce fronthaul transmission bandwidth associated with 5G/NR or LTE networks by supporting functional splitting between the O-RAN distributed unit (O-DU) and the ORAN radio unit (RU), which may be located at a base station. The O-DU communicate with the O-RU using control messaging which includes a header indicating an allocation of resource block groups (RBGs) configured to convey data. The O-DU may signal whether that RBG is used for data allocation by enabling or disabling the bits in a bit mask parameter (e.g., rbgMask) of the header of the control message.

The number of bits contained in the control message may be based on the parameter RBG mask parameter, in which a single bit of the RBG mask represents a group of RBs. In some cases, however, the number of bits contained in the RBG mask may increase signaling overhead between the O-DU and the O-RU. To reduce the signaling overhead and increase communications efficiency between the O-DU and the O-RU, the O-DU may dynamically configure the number of bits included in the RBG mask based on a radio access technology (RAT) type. The O-DU may generate the control message that includes the RBG mask, and may determine the size of the RBG mask in the control message based on the RAT type. The O-DU may populate the resource block group mask with bits representing the one or more resource block groups that are allocated for the data transmission in accordance with the size of the resource block group mask, and may transmit the control message to the O-RU.

A method for wireless communications at a wireless communications device is described. The method may include generating a control message that includes a resource block group mask that indicates one or more resource block groups that are to be allocated for a data transmission, determining a size of the resource block group mask in the control message based on a radio access technology type of the wireless communications, populating, in accordance with the size of the resource block group mask, the resource block group mask with bits representing the one or more resource block groups that are allocated for the data transmission, and transmitting the control message.

An apparatus for wireless communications at a wireless communications device is described. The apparatus may include a processor, memory in electronic communication with the processor, and instructions stored in the memory. The instructions may be executable by the processor to cause the apparatus to generate a control message that includes a resource block group mask that indicates one or more resource block groups that are to be allocated for a data transmission, determine a size of the resource block group mask in the control message based on a radio access technology type of the wireless communications, populating, in accordance with the size of the resource block group mask, the resource block group mask with bits represent the one or more resource block groups that are allocated for the data transmission, and transmit the control message.

Another apparatus for wireless communications at a wireless communications device is described. The apparatus may include means for generating a control message that includes a resource block group mask that indicates one or more resource block groups that are to be allocated for a data transmission, means for determining a size of the resource block group mask in the control message based on a radio access technology type of the wireless communications, means for populating, in accordance with the size of the resource block group mask, the resource block group mask with bits representing the one or more resource block groups that are allocated for the data transmission, and means for transmitting the control message.

A non-transitory computer-readable medium storing code for wireless communications at a wireless communications device is described. The code may include instructions executable by a processor to generate a control message that includes a resource block group mask that indicates one or more resource block groups that are to be allocated for a data transmission, determine a size of the resource block group mask in the control message based on a radio access technology type of the wireless communications, populating, in accordance with the size of the resource block group mask, the resource block group mask with bits represent the one or more resource block groups that are allocated for the data transmission, and transmit the control message.

In some examples of the method, apparatuses, and non-transitory computer-readable medium described herein, determining the size of the resource block group mask in the control message may include operations, features, means, or instructions for including one of a first maximum number of bits in the resource block group mask based on the radio access technology type being of a first type or a second maximum number of bits in the resource block group mask based on the radio access technology type being of a second type.

In some examples of the method, apparatuses, and non-transitory computer-readable medium described herein, the first maximum number of bits associated with the first type of radio access technology may be different from the second maximum number of bits associated with the second type of radio access technology.

In some examples of the method, apparatuses, and non-transitory computer-readable medium described herein, the first maximum number of bits may be 18 and the first type of radio access technology may be New Radio.

In some examples of the method, apparatuses, and non-transitory computer-readable medium described herein, the second maximum number of bits may be 28 and the second type of radio access technology may be Long Term Evolution.

In some examples of the method, apparatuses, and non-transitory computer-readable medium described herein, a number of bits in the resource block group mask may be variable based on the radio access technology type.

In some examples of the method, apparatuses, and non-transitory computer-readable medium described herein, a number of bits included in the resource block group mask may be allocated to a section header of the control message.

In some examples of the method, apparatuses, and non-transitory computer-readable medium described herein, the control message includes an enhanced common public radio interface control message.

In some examples of the method, apparatuses, and non-transitory computer-readable medium described herein, the wireless communications device may be an open radio access network (O-RAN) distributed unit and the control message may be transmitted to an O-RAN radio unit.

A method for wireless communications at a wireless communications device is described. The method may include determining a size of a resource block group mask indicating one or more resource block groups of a control message based on a radio access technology type of the wireless communications and receiving the control message in accordance with the size of the resource block group mask, the resource block group mask with bits representing the one or more resource block groups received in the control message.

An apparatus for wireless communications at a wireless communications device is described. The apparatus may include a processor, memory in electronic communication with the processor, and instructions stored in the memory. The instructions may be executable by the processor to cause the apparatus to determine a size of a resource block group mask indicating one or more resource block groups of a control message based on a radio access technology type of the wireless communications and receive the control message in accordance with the size of the resource block group mask, the resource block group mask with bits representing the one or more resource block groups received in the control message.

Another apparatus for wireless communications at a wireless communications device is described. The apparatus may include means for determining a size of a resource block group mask indicating one or more resource block groups of a control message based on a radio access technology type of the wireless communications and means for receiving the control message in accordance with the size of the resource block group mask, the resource block group mask with bits representing the one or more resource block groups received in the control message.

A non-transitory computer-readable medium storing code for wireless communications at a wireless communications device is described. The code may include instructions executable by a processor to determine a size of a resource block group mask indicating one or more resource block groups of a control message based on a radio access technology type of the wireless communications and receive the control message in accordance with the size of the resource block group mask, the resource block group mask with bits representing the one or more resource block groups received in the control message.

In some examples of the method, apparatuses, and non-transitory computer-readable medium described herein, determining the size of the resource block group mask may include operations, features, means, or instructions for identifying one of a first maximum number of bits in the resource block group mask based on the radio access technology type being of a first type or a second maximum number of bits in the resource block group mask based on the radio access technology type being of a second type.

In some examples of the method, apparatuses, and non-transitory computer-readable medium described herein, the first maximum number of bits associated with the first type of radio access technology may be different from the second maximum number of bits associated with the second type of radio access technology.

In some examples of the method, apparatuses, and non-transitory computer-readable medium described herein, the first maximum number of bits may be 18 and the first type of radio access technology may be New Radio.

In some examples of the method, apparatuses, and non-transitory computer-readable medium described herein, the second maximum number of bits may be 28 and the second type of radio access technology may be Long Term Evolution.

In some examples of the method, apparatuses, and non-transitory computer-readable medium described herein, a number of bits in the resource block group mask may be variable based on the radio access technology type.

In some examples of the method, apparatuses, and non-transitory computer-readable medium described herein, a number of bits included in the resource block group mask may be allocated to a section header of the control message.

In some examples of the method, apparatuses, and non-transitory computer-readable medium described herein, the control message includes an enhanced common public radio interface control message.

In some examples of the method, apparatuses, and non-transitory computer-readable medium described herein, the wireless communications device may be an open radio access network (O-RAN) radio unit and the control message may be received from an O-RAN distributed unit.

DETAILED DESCRIPTION

Figure 1:
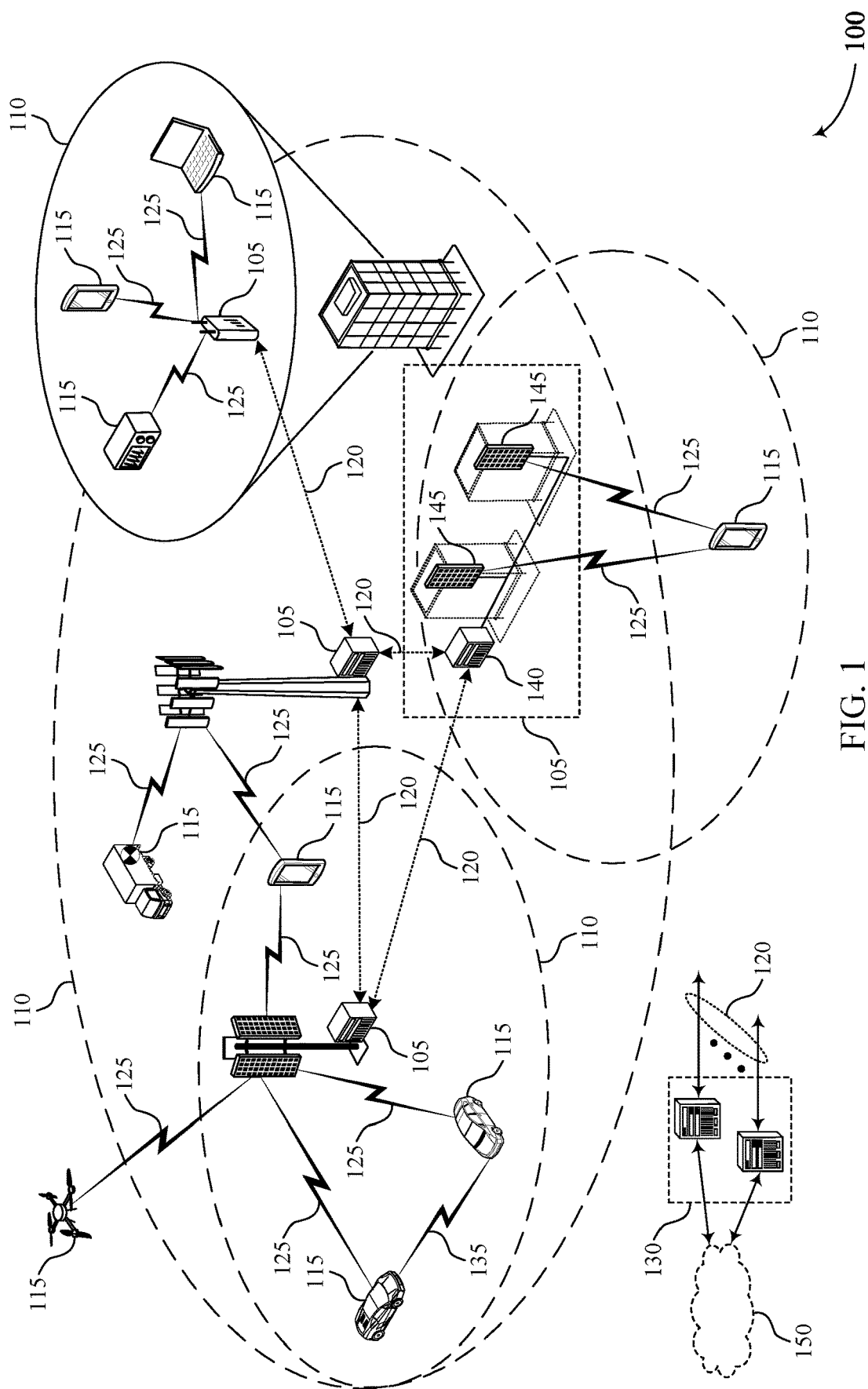
FIG. 1 illustrates an example of a wireless communications system that supports dynamic bit width determination for resource block group mask in accordance with aspects of the present disclosure.

To support efficient interoperability between wireless communications devices associated with a multivendor radio access network (RAN), a wireless communications network may operate in accordance with an open-RAN (O-RAN) network specification. O-RAN operation may reduce fronthaul transmission bandwidth associated with fifth generation (5G) or New Radio (NR) networks or Long Term Evolution (LTE) networks by supporting functional splitting between the O-RAN distributed unit (O-DU) and the O-RAN radio unit (RU). The O-DU may configure the O-RU using an initial management plane (M-Plane) message and may further communicate with the O-RU using a control (C-plane) message. In some examples, the control message contains information related to O-RU operation such as various actions the O-RU should take in order to receive and process incoming data.

The O-DU may configure the control message as an enhanced common public radio interface (e-CPRI) message which includes an e-CPRI header, including a section header and a section type. The section header may provide information to the O-RU of how to read the corresponding data in the user plane, including an allocation of resource block groups (RBGs) configured to convey data. The O-DU may signal whether that RBG is used for data allocation by enabling or disabling the bits in a bit mask parameter (e.g., rbgMask) of the control message. The number of bits contained in the control message may be based on the parameter RBG mask parameter, in which a single bit of the RBG mask represents a group of resource blocks (RBs). In some radio access technologies (RATs), for example, a RAT associated with a 5G/NR system, a larger rbgMask may allow for fewer bits needed to represent the total number of RBs in the control message.

In some cases, however, the number of bits contained in the RBG mask may increase signaling overhead between the O-DU and the O-RU. In addition, processing degradation may occur at the O-RU in cases where an excess number of bits is received in the control message. To reduce the signaling overhead and increase communications efficiency between the O-DU and the O-RU, the O-DU may dynamically configure the number of bits included in the RBG mask based on a RAT type. For example, the O-DU may determine that it is operating in a 5G/NR system and may allocate 18 bits for the RBG-mask based on the RAT type being a 5G/NR RAT. In another example, the O-DU may determine that it is operating in an LTE system, and may allocate 28 bits for the RBG mask based on the RAT type being an LTE RAT. In yet another example, the O-DU may determine that it is operating in a different RAT (e.g., different from the 5G/NR or LTE RAT) and may allocate a different or same number of bits for the RBG mask based on the different RAT type.

Particular aspects of the subject matter described herein may be implemented to realize one or more advantages. The described techniques may support improvements in techniques for operations and signaling in an ORAN. In some examples, the techniques may allow for decreased signaling overhead and complexity, in addition to decreased network congestion. For example, by reducing the number of bits in the header of the control message associated with a 5G/NR network may reduce signaling between the O-DU and the O-RU of the 5G/NR network. In addition, the techniques may decrease processing time for the control message at the O-RU. As such, supported techniques may include improved network operations and, in some examples, may promote increased communications efficiency, among other benefits.

Aspects of the disclosure are initially described in the context of wireless communications systems. Aspects of the disclosure are further illustrated by and described with reference to an ORAN functional split architecture diagram, an ORAN signaling configuration diagram, apparatus diagrams, system diagrams, and flowcharts that relate to dynamic bit width determination for resource block group mask.

FIG. 1 illustrates an example of a wireless communications system 100 that supports dynamic bit width determination for resource block group mask in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s = 1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

To support efficient interoperability between wireless communications devices associated with a multivendor RAN, a wireless communications network may operate in accordance with an open-RAN (ORAN) network specification. ORAN operation may reduce fronthaul transmission bandwidth associated with 5G/NR or LTE networks by supporting functional splitting between the O-RAN distributed unit (O-DU) and the ORAN radio unit (RU), which may be located at a base station 105.

The O-DU communicate with the O-RU using a control message which includes a header indicating an allocation of resource block groups (RBGs) configured to convey data. The O-DU may signal whether that RBG is used for data allocation by enabling or disabling the bits in a bit mask parameter (e.g., rbgMask) of the control message.

The number of bits contained in the control message may be based on the parameter RBG mask parameter, in which a single bit of the RBG mask represents a group of RBs. In some cases, however, the number of bits contained in the RBG mask may increase signaling overhead between the O-DU and the O-RU. To reduce the signaling overhead and increase communications efficiency between the O-DU and the O-RU, the O-DU may dynamically configure the number of bits included in the RBG mask based on a radio access technology (RAT) type. For example, the O-DU may determine that it is operating in a 5G/new radio (NR) system and may allocate 18 bits for the RBG-mask based on the RAT type being a 5G/NR RAT. In another example, the O-DU may determine that it is operating in an LTE system, and may allocate 28 bits for the RBG mask based on the RAT type being an LTE RAT.

Figure 2:
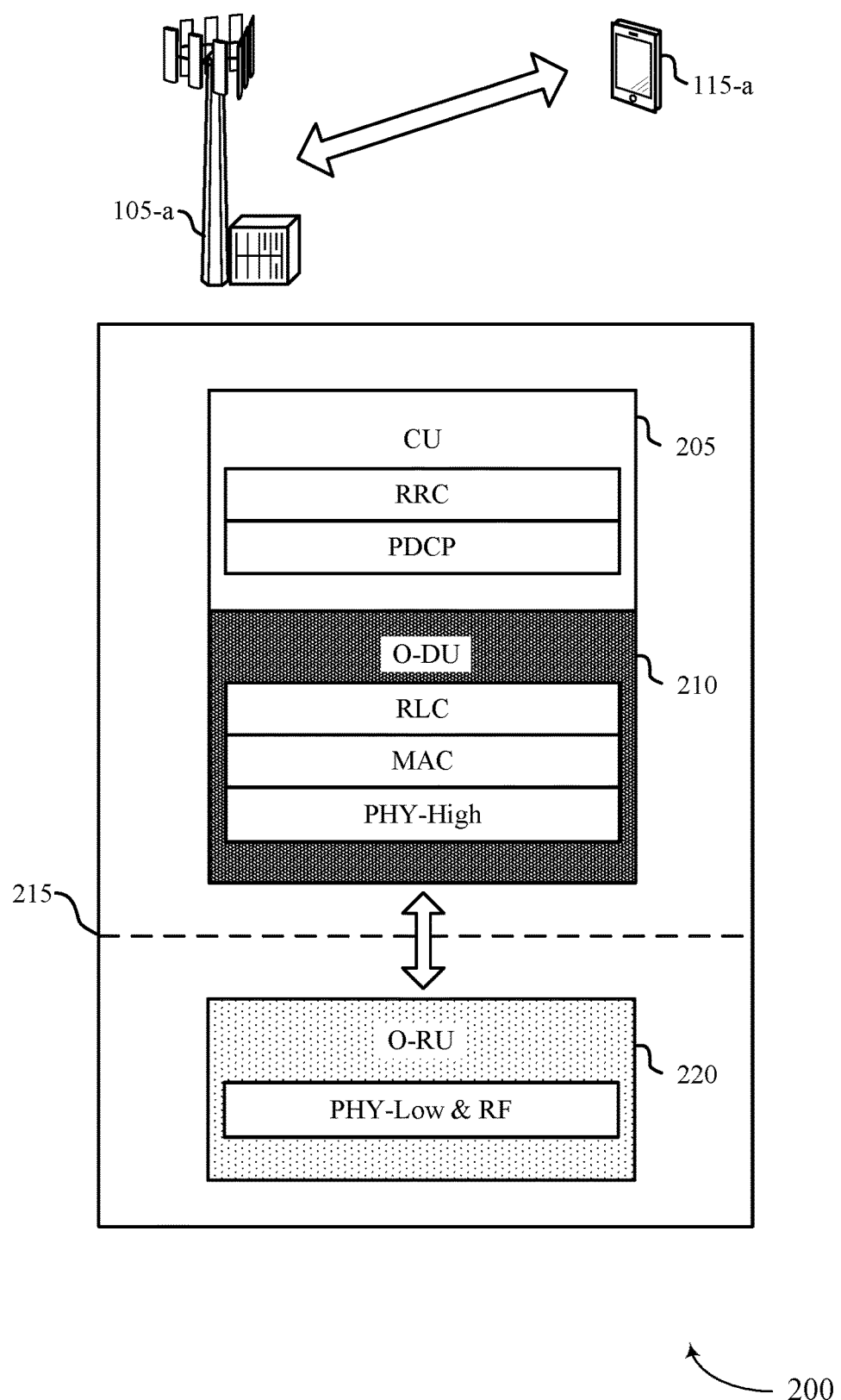
FIG. 2 illustrates an example of an ORAN functional split architecture that supports dynamic bit width determination for resource block group mask in accordance with aspects of the present disclosure.

FIG. 2 illustrates an example of an ORAN functional split architecture 200 that supports dynamic bit width determination for resource block group mask in accordance with aspects of the present disclosure. For example, the ORAN functional split architecture 200 may include a base station 105-a in communication with a UE 115-a, which may be examples of base stations 105 and UEs 115 as described with reference to FIG. 1.

Some wireless communications systems may support a centralized radio access network (C-RAN) architecture, which may connect baseband processing by a number of centralized base stations to one or more UEs via a direct link. In some cases, a common public radio interface (CPRI) used in the C-RAN may not support fronthaul interfaces, and as a result, different regions of the RAN may be specified by different vendors. Such multivendor RAN architecture may reduce interoperability between baseband processing at the base station and UEs in cases where the base station and UE are associated with different vendors.

To support efficient interoperability between wireless communications devices associated with a multivendor RAN, the network may operate in accordance with an open-RAN (O-RAN) network specification. O-RAN operation may reduce fronthaul transmission bandwidth associated with 5G/NR or LTE networks by supporting functional splitting that allows for some layer 1 (e.g., physical layer) functions to reallocated to increase efficiency. The functional split 215 occurs between the O-RAN distributed unit (O-DU) 210 and the O-RAN radio unit (RU) 220, which may be located at the base station 105-a. The O-DU 210 is a logical node containing the radio link control (RLC) and medium access control (MAC) layers in addition to higher physical layers such as the packet data convergence protocol (PDCP) layer. The O-RU 220 is a logical node containing lower physical layers and radio frequency processing based on lower layer function split. In some examples, the functional split 215 of the O-DU 210 and O-RU 220 may occur at the base station 105-a, and the O-DU 210 and O-RU 220 may contain a subset of the functions of the base station. The control and user plane communication with the O-RU 220 may be controlled by the O-DU 210.

In downlink communications and resource element mapping processes at the physical layer, the O-RU 220 may perform a number of operations such as OFDM phase compensation, inverse fast Fourier transform (iFFT), cyclic prefix addition, and digital beamforming. Additional physical layer functions may be performed by the O-DU 210, including resource element mapping, precoding, layer mapping, modulation, scrambling, rate matching and coding. In the uplink, the O-RU may perform OFDM phase compensation, FFT, cyclic prefix removal and digital beamforming functions reside in the O-RU 220. Additional physical layer functions including resource element de-mapping, equalization, de-modulation, de-scrambling, rate de-matching and de-coding may be performed by the O-DU 210.

The functional split between the O-RU 220 and O-DU 210 components may increase interface simplicity. For example, the transfer of user plane data is based on the transmission of resource elements or physical resource blocks, which simplifies the data mapping and limits the number of associated control messages transmitted from the O-DU 210 to the O-RU 215. In addition, the interface design may support different beamforming techniques (e.g., digital beamforming, analog beamforming) as well as different beamforming algorithms. The functional split may also increase interoperability and reduce O-RU 215 complexity (e.g., fewer functions at O-RU 215).

In O-RAN, the centralized unit (CU) 205 supports a protocol stack (e.g., including RRC and PDCP layers) that includes functions of the base station 105-*a* including transfer of user data (e.g., data from UE 115-*a*), mobility control, RAN sharing, session management, and communications with the O-DU 210.

The O-DU 210 may transmit control messages to the O-RU 220 in accordance with the functional split. In some examples, the control message may be an enhanced common public radio interface (eCPRI) message. The eCPRI message may contain an eCPRI header, which contains information such as message type, eCPRI payload size, destination identifiers, etc. In some examples, the eCPRI header may contain information (e.g., in a section header) which notifies the O-RU 220 of how to interpret the data of the control message in the user plane. The eCPRI message may further contain radio frame, subframe, slot, or OFDM symbol information of one or more physical resource blocks.

The O-RU 220 may receive the eCPRI message, which may notify the O-RU 220 of what action the O-RU 220 should take on incoming data, or what action the O-RU 220 should take on decoded data over the air from the user. In some cases, however, the number of bits contained in the eCPRI message may be computationally expensive for processing by the O-RU 220 and may increase signaling overhead between the O-DU 210 and the O-RU 220. Accordingly, in some examples, the O-DU 210 may dynamically adjust the number of bits contained in the eCPRI message. For example, the O-DU 210 may determine the number of bits contained in the eCPRI message based on RAT type (e.g., 5G/NR, LTE, etc.). Such dynamic adjustment of the number of bits may increase system efficiency and reduce overhead associated with signaling between the O-DU 210 and the O-RU 220.

Figure 3:
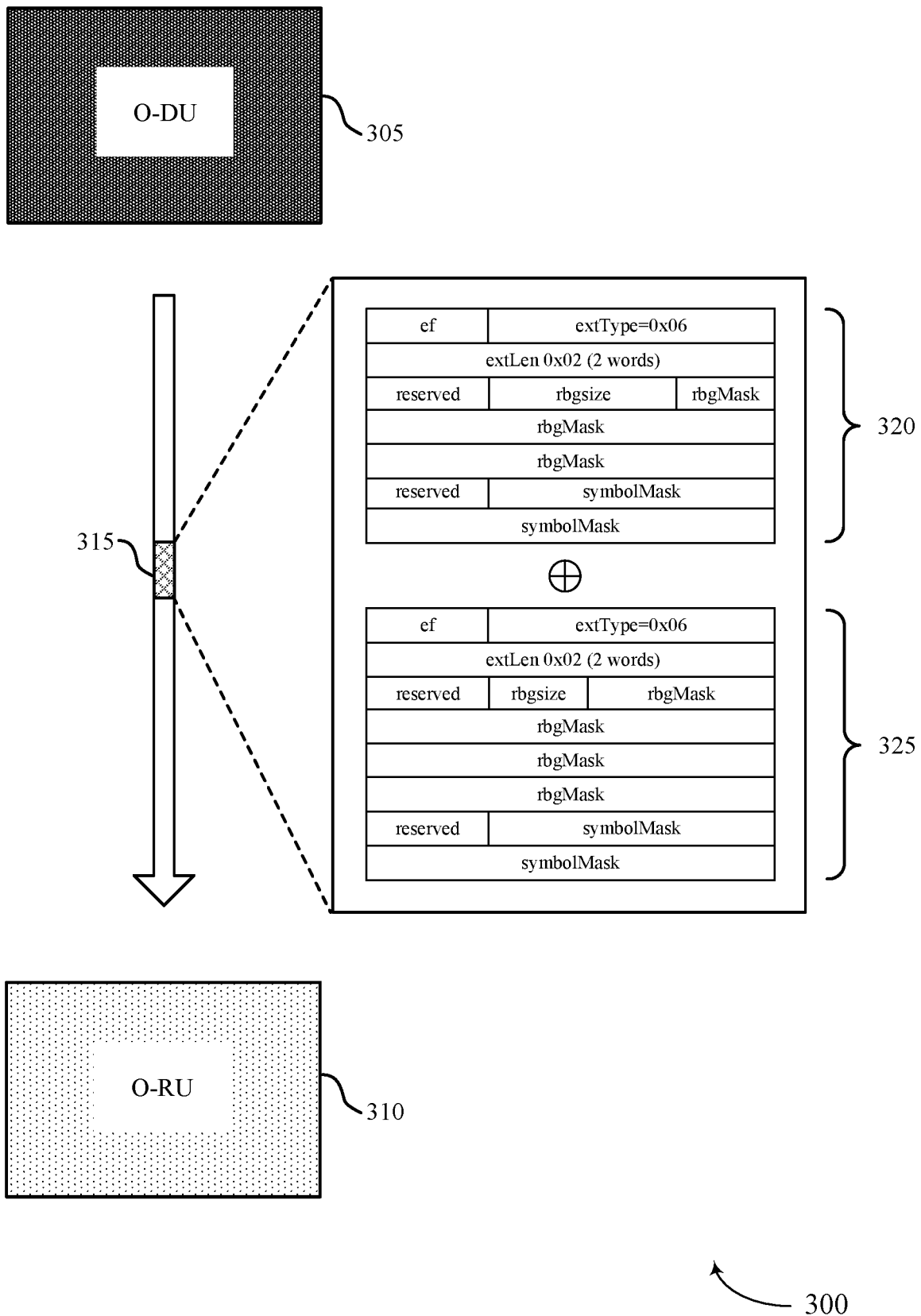
FIG. 3 illustrates an example of an ORAN signaling configuration that supports dynamic bit width determination for resource block group mask in accordance with aspects of the present disclosure.

FIG. 3 illustrates an example of an ORAN signaling configuration 300 that supports dynamic bit width determination for resource block group mask in accordance with aspects of the present disclosure. The ORAN signaling configuration 300 includes signaling between the base station components O-DU 305 and O-RU 310 (e.g., which may be examples of the corresponding devices described with reference to FIG. 2). Alternative examples of the following signaling structure may be implemented, for example, signaling may occur from the O-DU 305 to the O-RU 310, or from the O-RU 310 to the O-DU 305. In addition, while ORAN signaling configuration occurs at a base station, it should be understood that these processes may occur between any number of network devices.

Some wireless communications systems support O-RAN architecture including a functional split between the O-RU 305 and the O-DU 310. The O-RAN system described in FIG. 2 may operate in accordance with the resource allocation type 0 (RAT-0) and is supported through extension Type-6. The extension Type-6 may enable allocation of non-contiguous sets of physical resource blocks (PRBs) in both the frequency domain and time domain.

A base station supporting an O-RAN architecture may include O-DU 305 which may communicate with O-RU 310. The O-DU 305 may configure the O-RU 310 using an initial management plane (M-Plane) message, and may further control or communicate with the O-RU 310 using a control (C-plane) message 315. In some examples, the control message 315 contains information for operation of the O-RU 310 such as an indication of various actions the O-RU 310 should take in order to receive and process incoming data. In some other examples, the control message 315 may indicate how the O-RU 310 should receive or process decoded data received over the air from the user. In some examples, the communications between the O-DU 305 and the O-RU 310 may be two-way (e.g., uplink or downlink) in accordance with the user plane, which may convey data that data in more than one direction.

The O-DU 305 may configure the control message 315 to transmit data to the O-RU 310. The control message may be an e-CPRI message which includes an e-CPRI header, including a section header and a section type. The section header may provide information to the O-RU 310 of how to read the corresponding data in the user plane. In a RAT-0 configuration, the e-CPRI message may include payload data and RBG based allocation where multiple RBs grouped into a Resource Block Group (RBG). The O-DU 305 may signal whether that RBG is used for data allocation by enabling or disabling the bits in a bit mask parameter (e.g., rbgMask).

The number of bits contained in the control message 310 may be based on the parameter RBG mask parameter, in which a single bit of the RBG mask represents a group of RBs. For example, if a first number of RBs are identified (e.g., 100 RBs) and are grouped according to a second number of RBs per one group (e.g., 4 RBs per group in an LTE system), then 25 bits may be included to represent the 100 RBs. In some RATs, for example, a RAT associated with a 5G/NR system, a larger rbgMask in may allow for fewer bits needed to represent the total number of RBs in the control message.

In some examples, the size of the control message may be based on the number of bits contained in the RBG mask. For example, in cases where the RBG mask contains 28 bits, the control message may include 28*X bits, where X is the number of sections of the control message (e.g., based on a number of UEs, how many RBs are allocated, fragmentation, etc.). In some cases, the number of bits contained in the RBG mask may increase signaling overhead between the O-DU 305 and the O-RU 310. In addition, processing degradation may occur at the O-RU 310 in cases where an excess number of bits is received in the control message 315.

To reduce the signaling overhead and increase communications efficiency between the O-DU 305 and the O-RU 310, the O-DU 305 may determine the number of bits included in the RBG mask based on RAT type. For example, the O-DU may determine that it is operating in a 5G/NR system and may allocate 18 bits for the RBG-mask based on the RAT type being a 5G/NR RAT. In another example, the O-DU 305 may determine that it is operating in an LTE system, and may allocate 28 bits for the RBG mask based on the RAT type being an LTE RAT. In yet another example, the O-DU 305 may determine that it is operating in a different RAT (e.g., different from the 5G/NR or LTE RAT) and may allocate a different or same number of bits for the RBG mask based on the different RAT type.

The O-DU 305 may generate the control message 310 that includes the RBG mask, and may determine the size of the RBG mask in the control message 310 based on the RAT type. The O-DU 305 may populate the resource block group mask with bits representing the one or more resource block groups that are allocated for the data transmission in accordance with the size of the resource block group mask, and may transmit the control message to the O-RU 310. The O-DU 305 may perform one or more calculations to determine the RBG mask size, or the O-DU 305 may determine the size based on an indication of the RAT type. In some examples, the O-DU may dynamically change the bit width of the RBG mask based on identifying a change in RAT type.

Control messages 320 and 325 are example control messages that the O-DU 305 may configure for different RAT types. Each row of control message 320 and 325 represent 8 bits (1 byte). The control messages may contain a number of control fields, for example, an extension flag (ef) field, a field indicating the extension type, a number of reserved fields, an RBG size field, an RBG mask field, and a symbol mask field.

Control message 320 is an example control message that the O-DU 305 may configure for a 5G/NR RAT type, in which the RBG mask includes 18 bits (e.g., 2.25 rows of the control message 320 are occupied by the rbgMask parameter). Control message 325 shows an example control message configuration that the O-DU 305 may configure for an LTE RAT, where the RBG mask includes 28 bits (e.g., 3.5 rows of the control message 325 are occupied by the rbgMask parameter). In some examples, the 18 bits associated with the 5G/NR RAT may be a maximum number of bits allocated for the 5G/NR RAT, and the 28 bits associated with the LTE RAT may be a maximum number of bits allocated for the LTE RAT.

By dynamically including a different number of bits in the RBG mask, the O-DU may reduce the number of bits in the control eCPRI message, which may decrease network congestion and signaling overhead in the ORAN. In addition, the processing time for the control message at the O-RU 310 may be decreased for shorter RBG masks.

Figure 4:
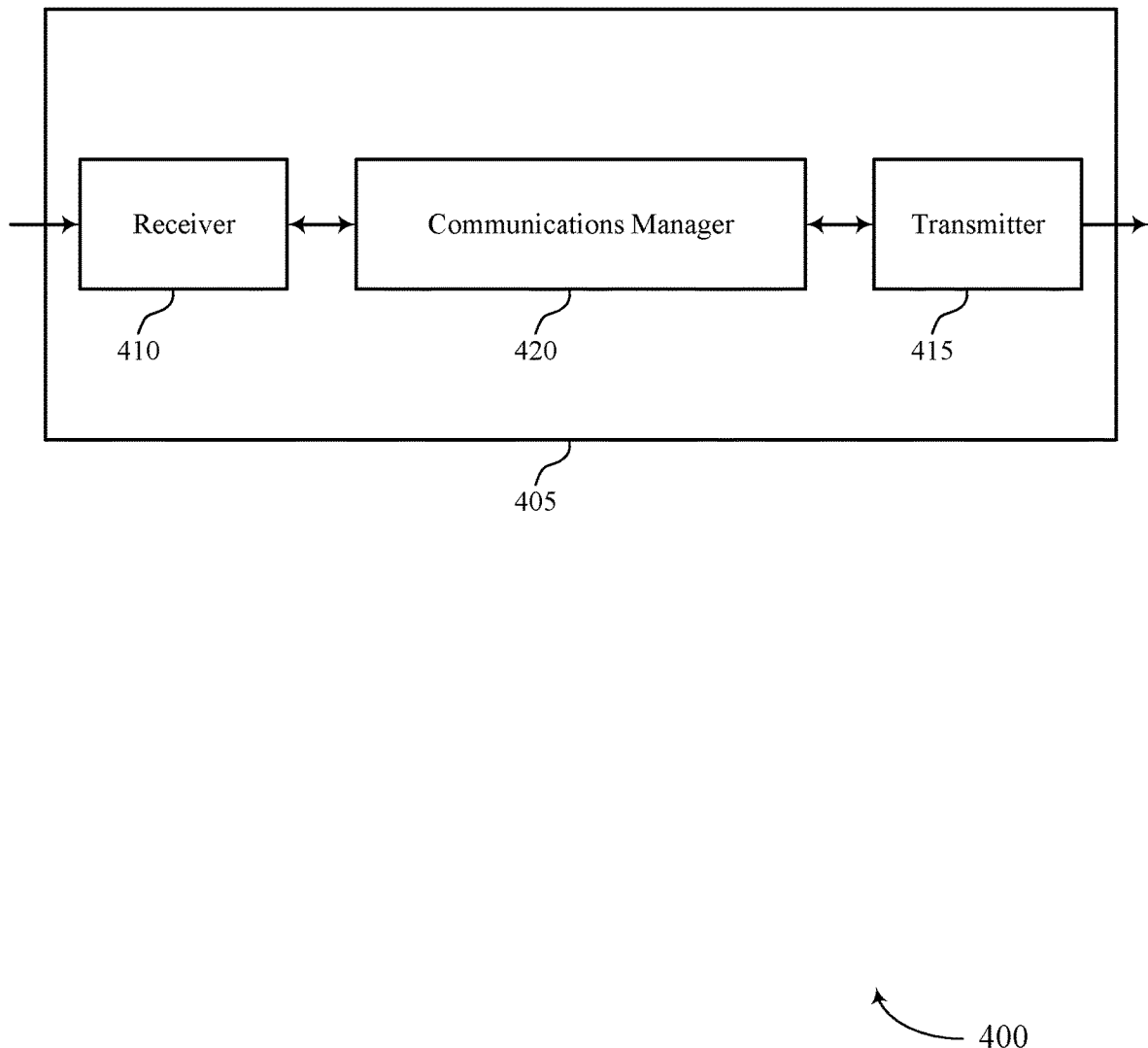
FIGS. 4 and 5 show block diagrams of devices that support dynamic bit width determination for resource block group mask in accordance with aspects of the present disclosure.

FIG. 4 shows a block diagram 400 of a device 405 that supports dynamic bit width determination for resource block group mask in accordance with aspects of the present disclosure. The device 405 may be an example of aspects of a base station 105 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to dynamic bit width determination for resource block group mask). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to dynamic bit width determination for resource block group mask). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of dynamic bit width determination for resource block group mask as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communications at a wireless communications device in accordance with examples as disclosed herein. For example, the communications manager 420 may be configured as or otherwise support a means for generating a control message that includes a resource block group mask that indicates one or more resource block groups that are to be allocated for a data transmission. The communications manager 420 may be configured as or otherwise support a means for determining a size of the resource block group mask in the control message based on a radio access technology type of the wireless communications. The communications manager 420 may be configured as or otherwise support a means for populating, in accordance with the size of the resource block group mask, the resource block group mask with bits representing the one or more resource block groups that are allocated for the data transmission. The communications manager 420 may be configured as or otherwise support a means for transmitting the control message.

Additionally or alternatively, the communications manager 420 may support wireless communications at a wireless communications device in accordance with examples as disclosed herein. For example, the communications manager 420 may be configured as or otherwise support a means for determining a size of a resource block group mask indicating one or more resource block groups of a control message based on a radio access technology type of the wireless communications. The communications manager 420 may be configured as or otherwise support a means for receiving the control message in accordance with the size of the resource block group mask, the resource block group mask with bits representing the one or more resource block groups received in the control message.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for dynamic bit width determination for RBG mask included in a control message transmitted from an O-DU to an O-RU.

In some examples, communications manager 420 may be implemented as an integrated circuit or chipset for a mobile device modem, and the receiver 410 and transmitter 415 may be implemented as analog components (e.g., amplifiers, filters, and antennas) coupled with the mobile device modem to enable wireless transmission and reception.

The communications manager 420 as described herein may be implemented to realize one or more potential advantages. At least one implementation may enable the O-DU to dynamically determine or change the bit width associated with an RBG mask of a control message based on RAT type. At least one implementation may enable to communications manager 420 to reduce the size of a control message based on RAT type, thus reducing signaling overhead.

Based on implementing the techniques as described herein, one or more processors of the device 405 (e.g., processor(s) controlling or incorporated with one or more of receiver 410, communications manager 420, and transmitter 415) may reduce the number of bits used in signaling between the O-DU and the O-RU, which may reduce signaling overhead and processing power needed for the control signaling. In some examples, the dynamic bit width determination may decrease excess signaling traffic and increase processing speeds.

Figure 5:
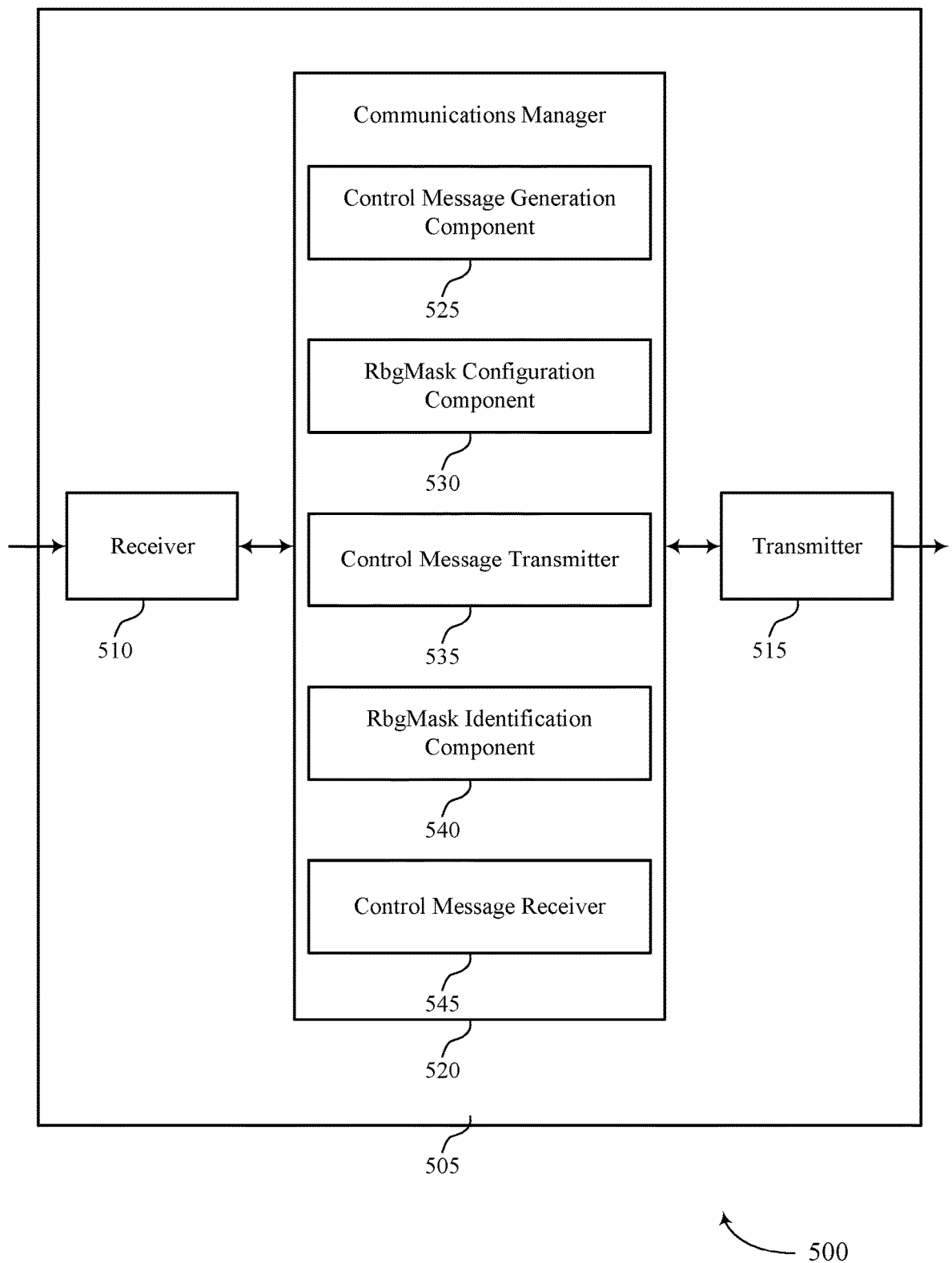

FIG. 5 shows a block diagram 500 of a device 505 that supports dynamic bit width determination for resource block group mask in accordance with aspects of the present disclosure. The device 505 may be an example of aspects of a device 405 or a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic bit width determination for resource block group mask). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic bit width determination for resource block group mask). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of dynamic bit width determination for resource block group mask as described herein. For example, the communications manager 520 may include a control message generation component 525, a rbgMask configuration component 530, a control message transmitter 535, a rbgMask identification component 540, a control message receiver 545, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a wireless communications device in accordance with examples as disclosed herein. The control message generation component 525 may be configured as or otherwise support a means for generating a control message that includes a resource block group mask that indicates one or more resource block groups that are to be allocated for a data transmission. The rbgMask configuration component 530 may be configured as or otherwise support a means for determining a size of the resource block group mask in the control message based on a radio access technology type of the wireless communications. The rbgMask configuration component 530 may be configured as or otherwise support a means for populating, in accordance with the size of the resource block group mask, the resource block group mask with bits representing the one or more resource block groups that are allocated for the data transmission. The control message transmitter 535 may be configured as or otherwise support a means for transmitting the control message.

Additionally or alternatively, the communications manager 520 may support wireless communications at a wireless communications device in accordance with examples as disclosed herein. The rbgMask identification component 540 may be configured as or otherwise support a means for determining a size of a resource block group mask indicating one or more resource block groups of a control message based on a radio access technology type of the wireless communications. The control message receiver 545 may be configured as or otherwise support a means for receiving the control message in accordance with the size of the resource block group mask, the resource block group mask with bits representing the one or more resource block groups received in the control message.

Figure 6:
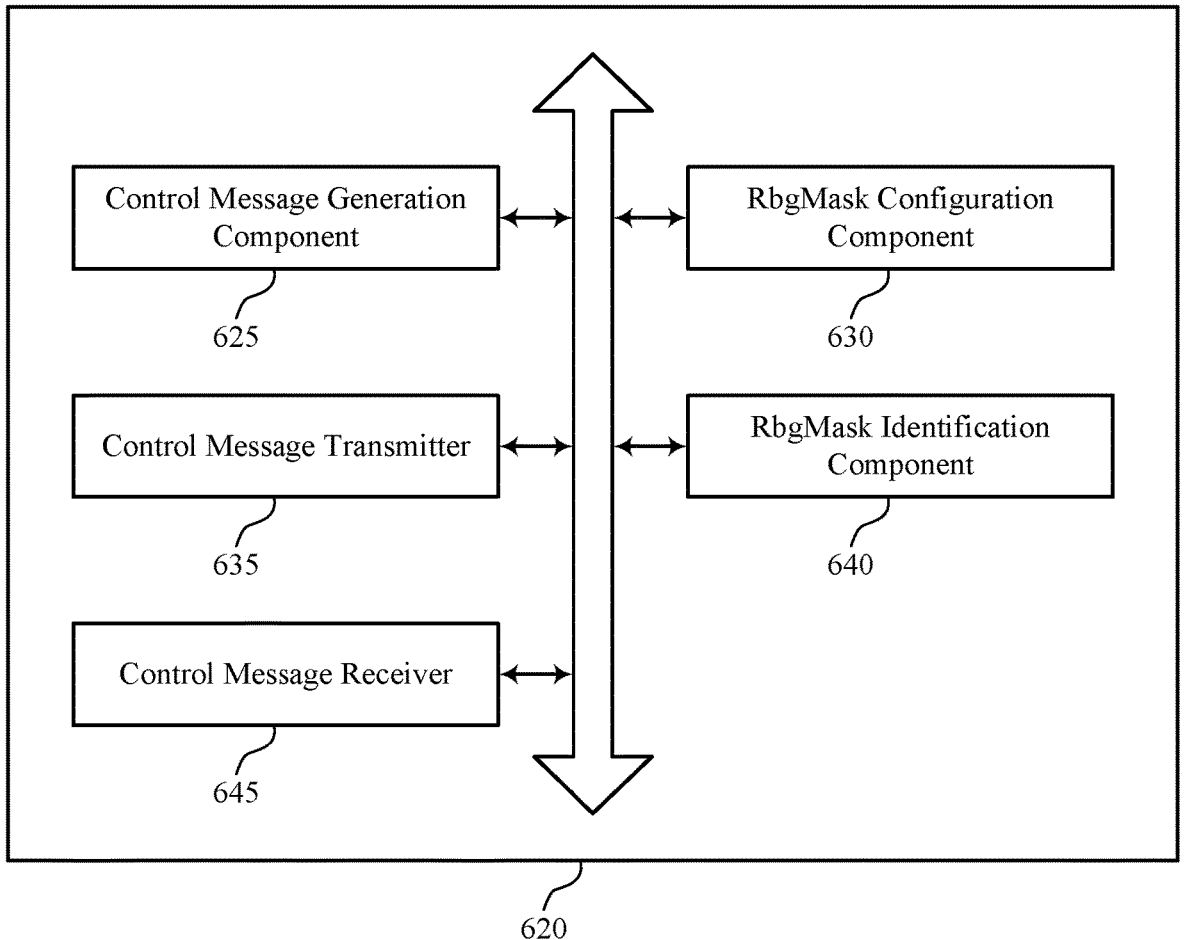
FIG. 6 shows a block diagram of a communications manager that supports dynamic bit width determination for resource block group mask in accordance with aspects of the present disclosure.

FIG. 6 shows a block diagram 600 of a communications manager 620 that supports dynamic bit width determination for resource block group mask in accordance with aspects of the present disclosure. The communications manager 620 may be an example of aspects of a communications manager 420, a communications manager 520, or both, as described herein. The communications manager 620, or various components thereof, may be an example of means for performing various aspects of dynamic bit width determination for resource block group mask as described herein. For example, the communications manager 620 may include a control message generation component 625, a rbgMask configuration component 630, a control message transmitter 635, a rbgMask identification component 640, a control message receiver 645, or any combination thereof. Each of these components may communicate, directly or indirectly, with one another (e.g., via one or more buses).

The communications manager 620 may support wireless communications at a wireless communications device in accordance with examples as disclosed herein. The control message generation component 625 may be configured as or otherwise support a means for generating a control message that includes a resource block group mask that indicates one or more resource block groups that are to be allocated for a data transmission. The rbgMask configuration component 630 may be configured as or otherwise support a means for determining a size of the resource block group mask in the control message based on a radio access technology type of the wireless communications. In some examples, the rbgMask configuration component 630 may be configured as or otherwise support a means for populating, in accordance with the size of the resource block group mask, the resource block group mask with bits representing the one or more resource block groups that are allocated for the data transmission. The control message transmitter 635 may be configured as or otherwise support a means for transmitting the control message.

In some examples, to support determining the size of the resource block group mask in the control message, the rbgMask configuration component 630 may be configured as or otherwise support a means for including one of a first maximum number of bits in the resource block group mask based on the radio access technology type being of a first type or a second maximum number of bits in the resource block group mask based on the radio access technology type being of a second type.

In some examples, the first maximum number of bits associated with the first type of radio access technology is different from the second maximum number of bits associated with the second type of radio access technology. In some examples, the first maximum number of bits is 18 and the first type of radio access technology is New Radio. In some examples, the second maximum number of bits is 28 and the second type of radio access technology is Long Term Evolution.

In some examples, a number of bits in the resource block group mask is variable based on the radio access technology type. In some examples, a number of bits included in the resource block group mask are allocated to a section header of the control message. In some examples, the control message includes an enhanced common public radio interface control message. In some examples, the wireless communications device is an open radio access network (O-RAN) distributed unit and the control message is transmitted to an O-RAN radio unit.

Additionally or alternatively, the communications manager 620 may support wireless communications at a wireless communications device in accordance with examples as disclosed herein. The rbgMask identification component 640 may be configured as or otherwise support a means for determining a size of a resource block group mask indicating one or more resource block groups of a control message based on a radio access technology type of the wireless communications. The control message receiver 645 may be configured as or otherwise support a means for receiving the control message in accordance with the size of the resource block group mask, the resource block group mask with bits representing the one or more resource block groups received in the control message.

In some examples, to support determining the size of the resource block group mask, the rbgMask identification component 640 may be configured as or otherwise support a means for identifying one of a first maximum number of bits in the resource block group mask based on the radio access technology type being of a first type or a second maximum number of bits in the resource block group mask based on the radio access technology type being of a second type.

In some examples, the first maximum number of bits associated with the first type of radio access technology is different from the second maximum number of bits associated with the second type of radio access technology.

In some examples, the first maximum number of bits is 18 and the first type of radio access technology is New Radio. In some examples, the second maximum number of bits is 28 and the second type of radio access technology is Long Term Evolution. In some examples, a number of bits in the resource block group mask is variable based on the radio access technology type.

In some examples, a number of bits included in the resource block group mask are allocated to a section header of the control message. In some examples, the control message includes an enhanced common public radio interface control message. In some examples, the wireless communications device is an open radio access network (O-RAN) radio unit and the control message is received from an O-RAN distributed unit.

Figure 7:
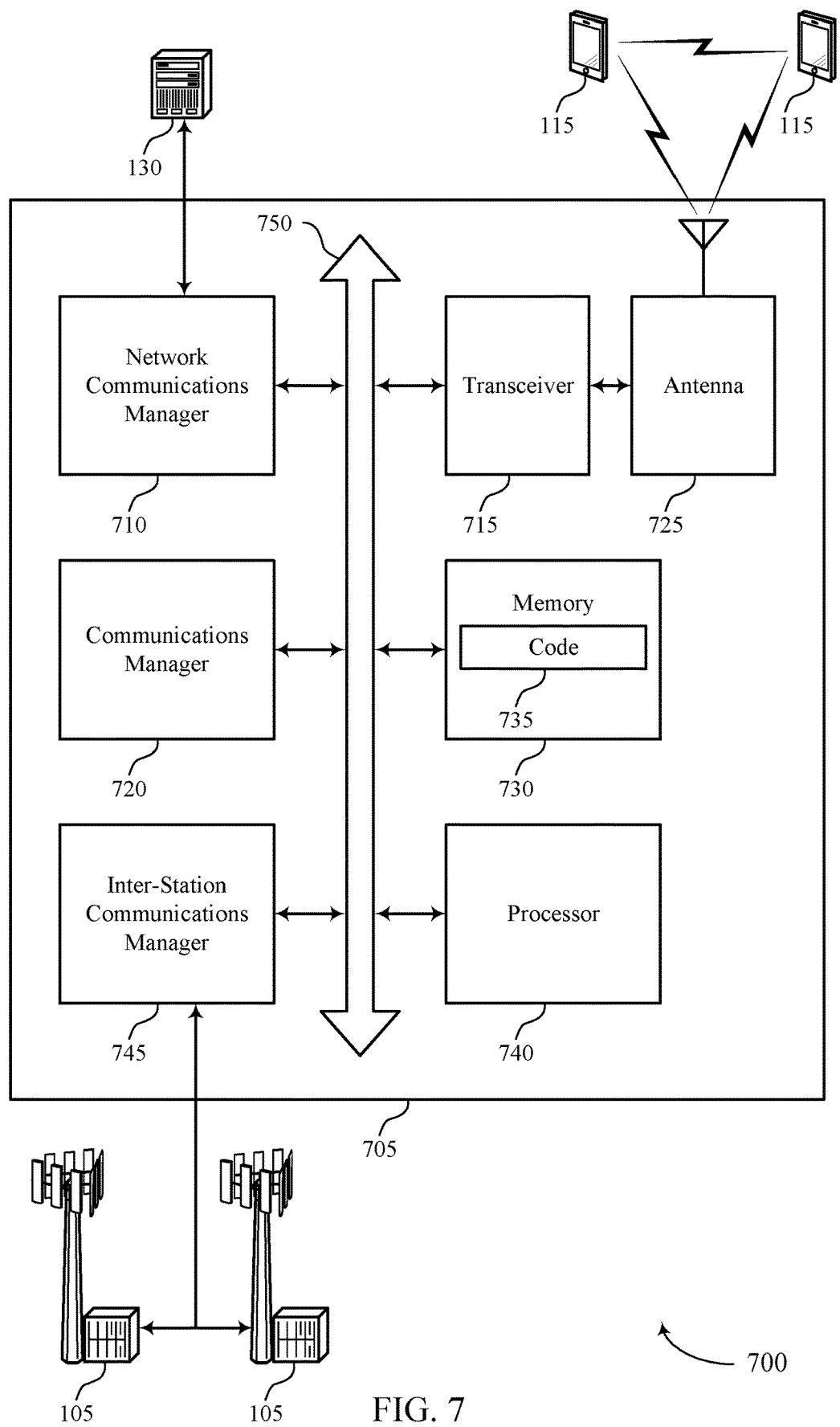
FIG. 7 shows a diagram of a system including a device that supports dynamic bit width determination for resource block group mask in accordance with aspects of the present disclosure.

FIG. 7 shows a diagram of a system 700 including a device 705 that supports dynamic bit width determination for resource block group mask in accordance with aspects of the present disclosure. The device 705 may be an example of or include the components of a device 405, a device 505, or a base station 105 as described herein. The device 705 may communicate wirelessly with one or more base stations 105, UEs 115, or any combination thereof. The device 705 may include components for bi-directional voice and data communications including components for transmitting and receiving communications, such as a communications manager 720, a network communications manager 710, a transceiver 715, an antenna 725, a memory 730, code 735, a processor 740, and an inter-station communications manager 745. These components may be in electronic communication or otherwise coupled (e.g., operatively, communicatively, functionally, electronically, electrically) via one or more buses (e.g., a bus 750).

The network communications manager 710 may manage communications with a core network 130 (e.g., via one or more wired backhaul links). For example, the network communications manager 710 may manage the transfer of data communications for client devices, such as one or more UEs 115.

In some cases, the device 705 may include a single antenna 725. However, in some other cases the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include RAM and ROM. The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a BIOS which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting dynamic bit width determination for resource block group mask). For example, the device 705 or a component of the device 705 may include a processor 740 and memory 730 coupled to the processor 740, the processor 740 and memory 730 configured to perform various functions described herein.

The inter-station communications manager 745 may manage communications with other base stations 105, and may include a controller or scheduler for controlling communications with UEs 115 in cooperation with other base stations 105. For example, the inter-station communications manager 745 may coordinate scheduling for transmissions to UEs 115 for various interference mitigation techniques such as beamforming or joint transmission. In some examples, the inter-station communications manager 745 may provide an X2 interface within an LTE/LTE-A wireless communications network technology to provide communication between base stations 105.

The communications manager 720 may support wireless communications at a wireless communications device in accordance with examples as disclosed herein. For example, the communications manager 720 may be configured as or otherwise support a means for generating a control message that includes a resource block group mask that indicates one or more resource block groups that are to be allocated for a data transmission. The communications manager 720 may be configured as or otherwise support a means for determining a size of the resource block group mask in the control message based on a radio access technology type of the wireless communications. The communications manager 720 may be configured as or otherwise support a means for populating, in accordance with the size of the resource block group mask, the resource block group mask with bits representing the one or more resource block groups that are allocated for the data transmission. The communications manager 720 may be configured as or otherwise support a means for transmitting the control message.

Additionally or alternatively, the communications manager 720 may support wireless communications at a wireless communications device in accordance with examples as disclosed herein. For example, the communications manager 720 may be configured as or otherwise support a means for determining a size of a resource block group mask indicating one or more resource block groups of a control message based on a radio access technology type of the wireless communications. The communications manager 720 may be configured as or otherwise support a means for receiving the control message in accordance with the size of the resource block group mask, the resource block group mask with bits representing the one or more resource block groups received in the control message.

By including or configuring the communications manager 720 in accordance with examples as described herein, the device 705 may support techniques for may support techniques for dynamic bit width determination for RBG mask included in a control message transmitted from an O-DU to an O-RU.

In some examples, communications manager 720 may be implemented as an integrated circuit or chipset for a mobile device modem, and the receiver 710 and transmitter 715 may be implemented as analog components (e.g., amplifiers, filters, and antennas) coupled with the mobile device modem to enable wireless transmission and reception.

The communications manager 720 as described herein may be implemented to realize one or more potential advantages. At least one implementation may enable communications manager 720 to effectively enable the O-DU to dynamically determine or change the bit width associated with an RBG mask of a control message based on RAT type. At least one implementation may enable to communications manager 720 to reduce the size of a control message based on RAT type, thus reducing signaling overhead.

Based on implementing the techniques as described herein, one or more processors of the device 705 (e.g., processor(s) controlling or incorporated with one or more of receiver 710, communications manager 720, and transmitter 715) may reduce the number of bits used in signaling between the O-DU and the O-RU, which may reduce signaling overhead and processing power needed for the control signaling. In some examples, the dynamic bit width determination may decrease excess signaling traffic and increase processing speeds. In some cases, the dynamic bit width determination may improve communication reliability, reduce latency and power consumption, and enable improved utilization of processing capability.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of dynamic bit width determination for resource block group mask as described herein, or the processor 740 and the memory 730 may be otherwise configured to perform or support such operations.

Figure 8:
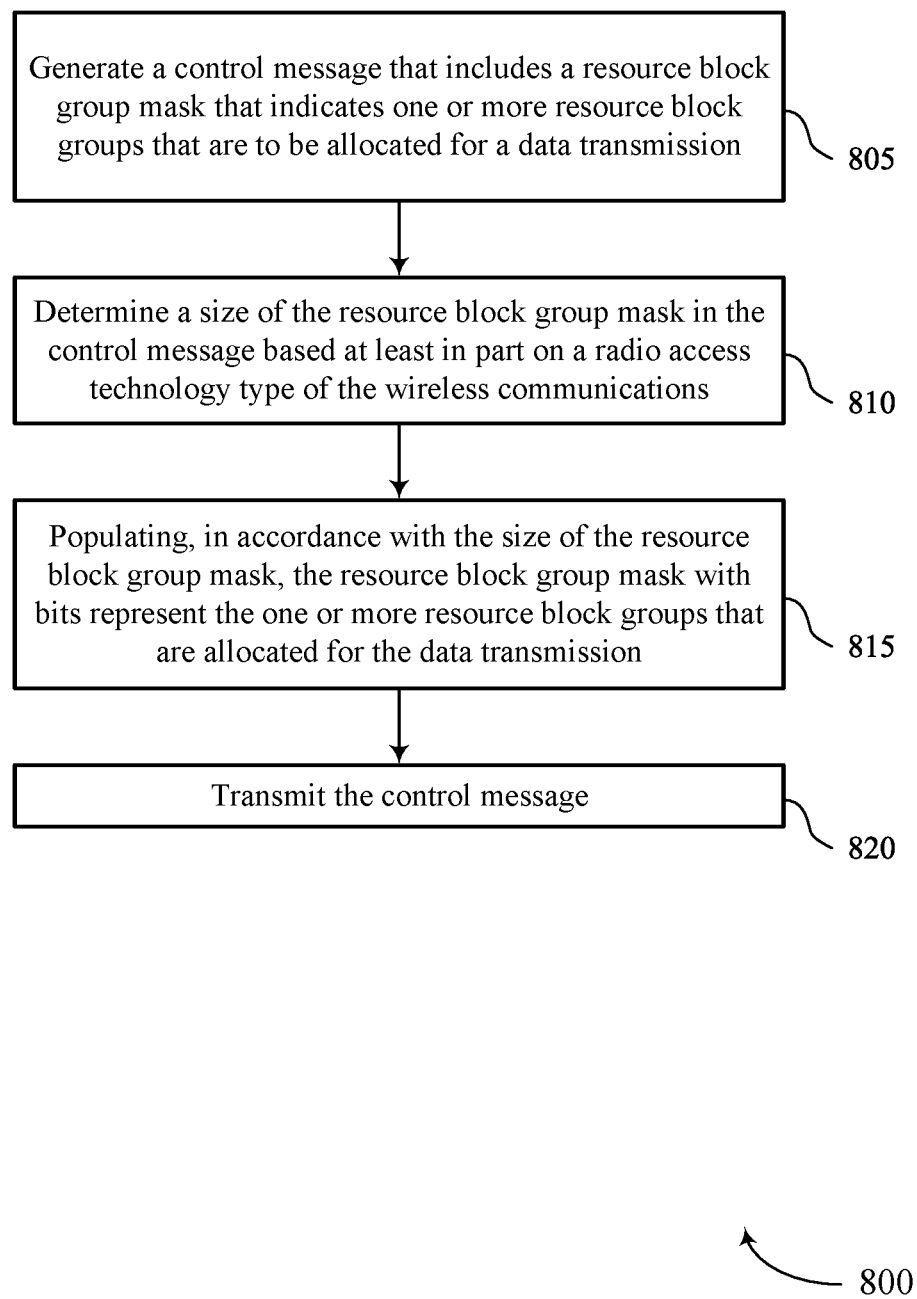
FIGS. 8 through 11 show flowcharts illustrating methods that support dynamic bit width determination for resource block group mask in accordance with aspects of the present disclosure.

FIG. 8 shows a flowchart illustrating a method 800 that supports dynamic bit width determination for resource block group mask in accordance with aspects of the present disclosure. The operations of the method 800 may be implemented by a base station or its components as described herein. For example, the operations of the method 800 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 805, the method may include generating a control message that includes a resource block group mask that indicates one or more resource block groups that are to be allocated for a data transmission. The operations of 805 may be performed in accordance with examples as disclosed herein. In some examples, aspects of the operations of 805 may be performed by a control message generation component 625 as described with reference to FIG. 6.

At 810, the method may include determining a size of the resource block group mask in the control message based on a radio access technology type of the wireless communications. The operations of 810 may be performed in accordance with examples as disclosed herein. In some examples, aspects of the operations of 810 may be performed by a rbgMask configuration component 630 as described with reference to FIG. 6.

At 815, the method may include populating, in accordance with the size of the resource block group mask, the resource block group mask with bits representing the one or more resource block groups that are allocated for the data transmission. The operations of 815 may be performed in accordance with examples as disclosed herein. In some examples, aspects of the operations of 815 may be performed by a rbgMask configuration component 630 as described with reference to FIG. 6.

At 820, the method may include transmitting the control message. The operations of 820 may be performed in accordance with examples as disclosed herein. In some examples, aspects of the operations of 820 may be performed by a control message transmitter 635 as described with reference to FIG. 6.

Figure 9:
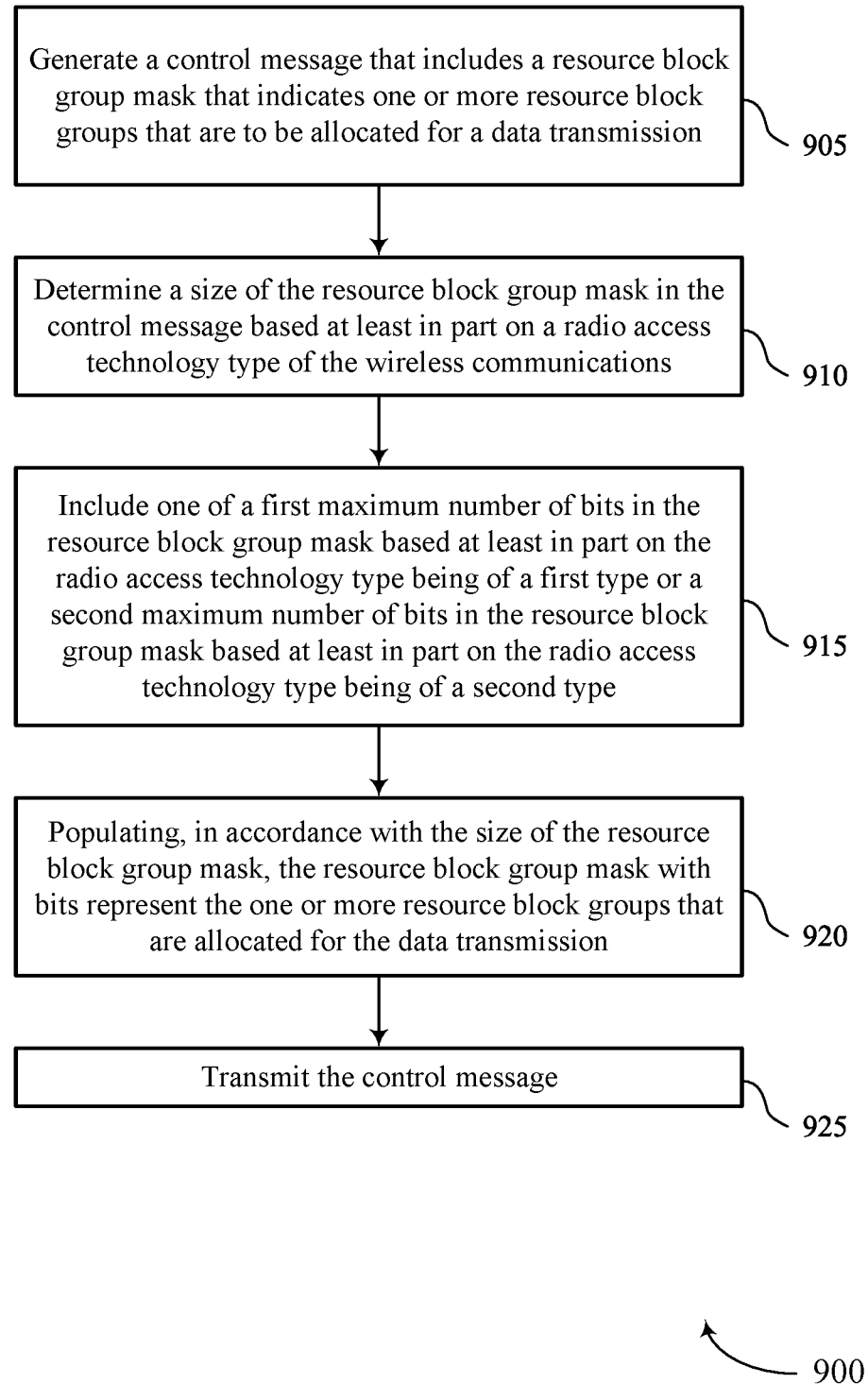

FIG. 9 shows a flowchart illustrating a method 900 that supports dynamic bit width determination for resource block group mask in accordance with aspects of the present disclosure. The operations of the method 900 may be implemented by a base station or its components as described herein. For example, the operations of the method 900 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 905, the method may include generating a control message that includes a resource block group mask that indicates one or more resource block groups that are to be allocated for a data transmission. The operations of 905 may be performed in accordance with examples as disclosed herein. In some examples, aspects of the operations of 905 may be performed by a control message generation component 625 as described with reference to FIG. 6.

At 910, the method may include determining a size of the resource block group mask in the control message based on a radio access technology type of the wireless communications. The operations of 910 may be performed in accordance with examples as disclosed herein. In some examples, aspects of the operations of 910 may be performed by a rbgMask configuration component 630 as described with reference to FIG. 6.

At 915, the method may include including one of a first maximum number of bits in the resource block group mask based on the radio access technology type being of a first type or a second maximum number of bits in the resource block group mask based on the radio access technology type being of a second type. The operations of 915 may be performed in accordance with examples as disclosed herein. In some examples, aspects of the operations of 915 may be performed by a rbgMask configuration component 630 as described with reference to FIG. 6.

At 920, the method may include populating, in accordance with the size of the resource block group mask, the resource block group mask with bits representing the one or more resource block groups that are allocated for the data transmission. The operations of 920 may be performed in accordance with examples as disclosed herein. In some examples, aspects of the operations of 920 may be performed by a rbgMask configuration component 630 as described with reference to FIG. 6.

At 925, the method may include transmitting the control message. The operations of 925 may be performed in accordance with examples as disclosed herein. In some examples, aspects of the operations of 925 may be performed by a control message transmitter 635 as described with reference to FIG. 6.

Figure 10:
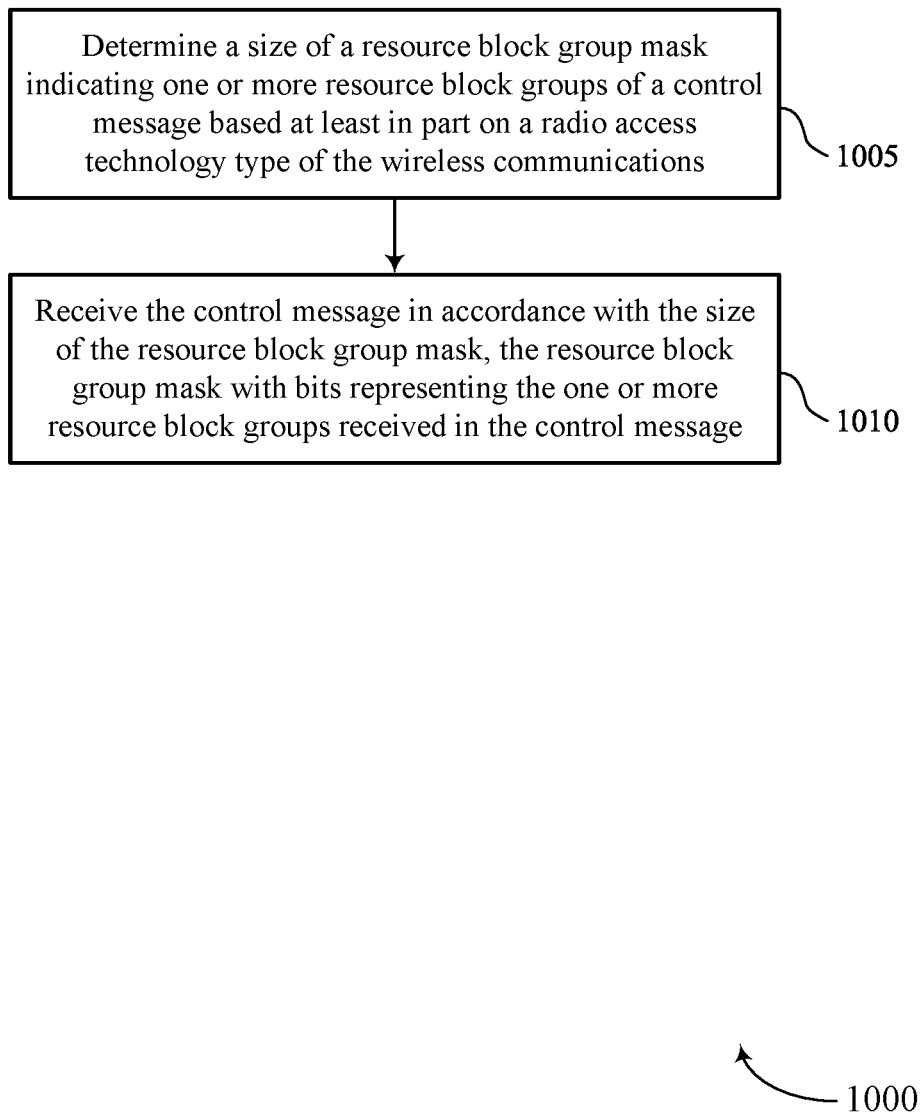

FIG. 10 shows a flowchart illustrating a method 1000 that supports dynamic bit width determination for resource block group mask in accordance with aspects of the present disclosure. The operations of the method 1000 may be implemented by a base station or its components as described herein. For example, the operations of the method 1000 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1005, the method may include determining a size of a resource block group mask indicating one or more resource block groups of a control message based on a radio access technology type of the wireless communications. The operations of 1005 may be performed in accordance with examples as disclosed herein. In some examples, aspects of the operations of 1005 may be performed by a rbgMask identification component 640 as described with reference to FIG. 6.

At 1010, the method may include receiving the control message in accordance with the size of the resource block group mask, the resource block group mask with bits representing the one or more resource block groups received in the control message. The operations of 1010 may be performed in accordance with examples as disclosed herein. In some examples, aspects of the operations of 1010 may be performed by a control message receiver 645 as described with reference to FIG. 6.

Figure 11:
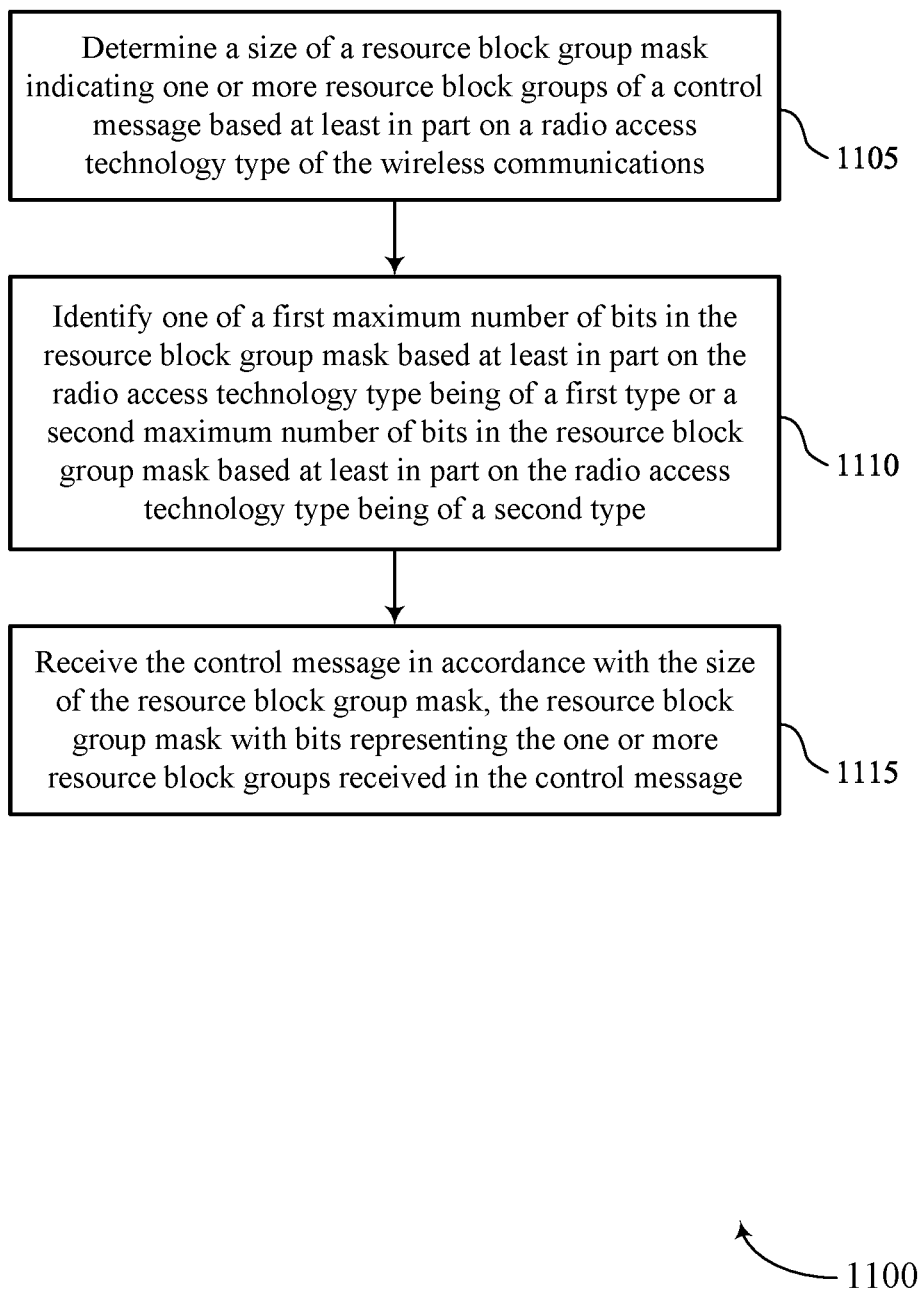

FIG. 11 shows a flowchart illustrating a method 1100 that supports dynamic bit width determination for resource block group mask in accordance with aspects of the present disclosure. The operations of the method 1100 may be implemented by a base station or its components as described herein. For example, the operations of the method 1100 may be performed by a base station 105 as described with reference to FIGS. 1 through 7. In some examples, a base station may execute a set of instructions to control the functional elements of the base station to perform the described functions. Additionally or alternatively, the base station may perform aspects of the described functions using special-purpose hardware.

At 1105, the method may include determining a size of a resource block group mask indicating one or more resource block groups of a control message based on a radio access technology type of the wireless communications. The operations of 1105 may be performed in accordance with examples as disclosed herein. In some examples, aspects of the operations of 1105 may be performed by a rbgMask identification component 640 as described with reference to FIG. 6.

At 1110, the method may include identifying one of a first maximum number of bits in the resource block group mask based on the radio access technology type being of a first type or a second maximum number of bits in the resource block group mask based on the radio access technology type being of a second type. The operations of 1110 may be performed in accordance with examples as disclosed herein. In some examples, aspects of the operations of 1110 may be performed by a rbgMask identification component 640 as described with reference to FIG. 6.

At 1115, the method may include receiving the control message in accordance with the size of the resource block group mask, the resource block group mask with bits representing the one or more resource block groups received in the control message. The operations of 1115 may be performed in accordance with examples as disclosed herein. In some examples, aspects of the operations of 1115 may be performed by a control message receiver 645 as described with reference to FIG. 6.

SUMMARY OF ASPECTS

The following provides an overview of aspects of the present disclosure:

Aspect 1: A method for wireless communications at a wireless communications device, comprising: generating a control message that includes a resource block group mask that indicates one or more resource block groups that are to be allocated for a data transmission; determining a size of the resource block group mask in the control message based at least in part on a radio access technology type of the wireless communications; populating, in accordance with the size of the resource block group mask, the resource block group mask with bits representing the one or more resource block groups that are allocated for the data transmission; and transmitting the control message.

Aspect 2: The method of aspect 1, wherein determining the size of the resource block group mask in the control message comprises: including one of a first maximum number of bits in the resource block group mask based at least in part on the radio access technology type being of a first type or a second maximum number of bits in the resource block group mask based at least in part on the radio access technology type being of a second type.

Aspect 3: The method of aspect 2, wherein the first maximum number of bits associated with the first type of radio access technology is different from the second maximum number of bits associated with the second type of radio access technology.

Aspect 4: The method of any of aspects 2 through 3, wherein the first maximum number of bits is 18 and the first type of radio access technology is New Radio.

Aspect 5: The method of any of aspects 2 through 3, wherein the second maximum number of bits is 28 and the second type of radio access technology is Long Term Evolution.

Aspect 6: The method of any of aspects 1 through 5, wherein a number of bits in the resource block group mask is variable based at least in part on the radio access technology type.

Aspect 7: The method of any of aspects 1 through 6, wherein a number of bits included in the resource block group mask are allocated to a section header of the control message.

Aspect 8: The method of any of aspects 1 through 7, wherein the control message comprises an enhanced common public radio interface control message.

Aspect 9: The method of any of aspects 1 through 8, wherein the wireless communications device is an open radio access network (O-RAN) distributed unit and the control message is transmitted to an O-RAN radio unit.

Aspect 10: A method for wireless communications at a wireless communications device, comprising: determining a size of a resource block group mask indicating one or more resource block groups of a control message based at least in part on a radio access technology type of the wireless communications; and receiving the control message in accordance with the size of the resource block group mask, the resource block group mask with bits representing the one or more resource block groups received in the control message.

Aspect 11: The method of aspect 10, wherein determining the size of the resource block group mask comprises: identifying one of a first maximum number of bits in the resource block group mask based at least in part on the radio access technology type being of a first type or a second maximum number of bits in the resource block group mask based at least in part on the radio access technology type being of a second type.

Aspect 12: The method of aspect 11, wherein the first maximum number of bits associated with the first type of radio access technology is different from the second maximum number of bits associated with the second type of radio access technology.

Aspect 13: The method of any of aspects 11 through 12, wherein the first maximum number of bits is 18 and the first type of radio access technology is New Radio.

Aspect 14: The method of any of aspects 11 through 12, wherein the second maximum number of bits is 28 and the second type of radio access technology is Long Term Evolution.

Aspect 15: The method of any of aspects 10 through 14, wherein a number of bits in the resource block group mask is variable based at least in part on the radio access technology type.

Aspect 16: The method of any of aspects 10 through 15, wherein a number of bits included in the resource block group mask are allocated to a section header of the control message.

Aspect 17: The method of any of aspects 10 through 16, wherein the control message comprises an enhanced common public radio interface control message.

Aspect 18: The method of any of aspects 10 through 17, wherein the wireless communications device is an open radio access network (O-RAN) radio unit and the control message is received from an O-RAN distributed unit.

Aspect 19: An apparatus for wireless communications at a wireless communications device, comprising a processor; memory coupled with the processor; and instructions stored in the memory and executable by the processor to cause the apparatus to perform a method of any of aspects 1 through 9.

Aspect 20: An apparatus for wireless communications at a wireless communications device, comprising at least one means for performing a method of any of aspects 1 through 9.

Aspect 21: A non-transitory computer-readable medium storing code for wireless communications at a wireless communications device, the code comprising instructions executable by a processor to perform a method of any of aspects 1 through 9.

Aspect 22: An apparatus for wireless communications at a wireless communications device, comprising a processor; memory coupled with the processor; and instructions stored in the memory and executable by the processor to cause the apparatus to perform a method of any of aspects 10 through 18.

Aspect 23: An apparatus for wireless communications at a wireless communications device, comprising at least one means for performing a method of any of aspects 10 through 18.

Aspect 24: A non-transitory computer-readable medium storing code for wireless communications at a wireless communications device, the code comprising instructions executable by a processor to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a wireless communications device, comprising:
    generating a control message that includes a resource block group mask that indicates one or more resource block groups that are to be allocated for a data transmission;
    determining a size of the resource block group mask in the control message based at least in part on a radio access technology type of the wireless communications;
    populating, in accordance with the size of the resource block group mask, the resource block group mask with bits representing the one or more resource block groups that are allocated for the data transmission; and
    transmitting the control message.

2. The method of claim 1, wherein determining the size of the resource block group mask in the control message comprises:
    including one of a first maximum number of bits in the resource block group mask based at least in part on the radio access technology type being of a first type or a second maximum number of bits in the resource block group mask based at least in part on the radio access technology type being of a second type.

3. The method of claim 2, wherein the first maximum number of bits associated with the first type of radio access technology is different from the second maximum number of bits associated with the second type of radio access technology.

4. The method of claim 2, wherein the first maximum number of bits is 18 and the first type of radio access technology is New Radio.

5. The method of claim 2, wherein the second maximum number of bits is 28 and the second type of radio access technology is Long Term Evolution.

6. The method of claim 1, wherein a number of bits in the resource block group mask is variable based at least in part on the radio access technology type.

7. The method of claim 1, wherein a number of bits included in the resource block group mask are allocated to a section header of the control message.

8. The method of claim 1, wherein the control message comprises an enhanced common public radio interface control message.

9. The method of claim 1, wherein the wireless communications device is an open radio access network (O-RAN) distributed unit and the control message is transmitted to an O-RAN radio unit.

10. A method for wireless communications at a wireless communications device, comprising:
    determining a size of a resource block group mask indicating one or more resource block groups of a control message based at least in part on a radio access technology type of the wireless communications; and
    receiving the control message in accordance with the size of the resource block group mask, the resource block group mask with bits representing the one or more resource block groups received in the control message.

11. The method of claim 10, wherein determining the size of the resource block group mask comprises:
    identifying one of a first maximum number of bits in the resource block group mask based at least in part on the radio access technology type being of a first type or a second maximum number of bits in the resource block group mask based at least in part on the radio access technology type being of a second type.

12. The method of claim 11, wherein the first maximum number of bits associated with the first type of radio access technology is different from the second maximum number of bits associated with the second type of radio access technology.

13. The method of claim 11, wherein the first maximum number of bits is 18 and the first type of radio access technology is New Radio.

14. The method of claim 11, wherein the second maximum number of bits is 28 and the second type of radio access technology is Long Term Evolution.

15. The method of claim 10, wherein a number of bits in the resource block group mask is variable based at least in part on the radio access technology type.

16. The method of claim 10, wherein a number of bits included in the resource block group mask are allocated to a section header of the control message.

17. The method of claim 10, wherein the control message comprises an enhanced common public radio interface control message.

18. The method of claim 10, wherein the wireless communications device is an open radio access network (O-RAN) radio unit and the control message is received from an O-RAN distributed unit.

19. An apparatus for wireless communications at a wireless communications device, comprising:
    a processor;

memory coupled with the processor; and instructions stored in the memory and executable by the processor to cause the apparatus to:

generate a control message that includes a resource block group mask that indicates one or more resource block groups that are to be allocated for a data transmission;

determine a size of the resource block group mask in the control message based at least in part on a radio access technology type of the wireless communications;

populating, in accordance with the size of the resource block group mask, the resource block group mask with bits represent the one or more resource block groups that are allocated for the data transmission; and transmit the control message.

20. The apparatus of claim 19, wherein the instructions to determine the size of the resource block group mask in the control message are executable by the processor to cause the apparatus to:

include one of a first maximum number of bits in the resource block group mask based at least in part on the radio access technology type being of a first type or a second maximum number of bits in the resource block group mask based at least in part on the radio access technology type being of a second type.

21. The apparatus of claim 20, wherein the first maximum number of bits associated with the first type of radio access technology is different from the second maximum number of bits associated with the second type of radio access technology.

22. The apparatus of claim 20, wherein the first maximum number of bits is 18 and the first type of radio access technology is New Radio.

23. The apparatus of claim 20, wherein the second maximum number of bits is 28 and the second type of radio access technology is Long Term Evolution.

24. The apparatus of claim 19, wherein a number of bits in the resource block group mask is variable based at least in part on the radio access technology type.

25. The apparatus of claim 19, wherein a number of bits included in the resource block group mask are allocated to a section header of the control message.

26. The apparatus of claim 19, wherein the control message comprises an enhanced common public radio interface control message.

27. The apparatus of claim 19, wherein the wireless communications device is an open radio access network (O-RAN) distributed unit and the control message is transmitted to an O-RAN radio unit.

28. An apparatus for wireless communications at a wireless communications device, comprising:

a processor;

memory coupled with the processor; and instructions stored in the memory and executable by the processor to cause the apparatus to:

determine a size of a resource block group mask indicating one or more resource block groups of a control message based at least in part on a radio access technology type of the wireless communications; and receive the control message in accordance with the size of the resource block group mask, the resource block group mask with bits representing the one or more resource block groups received in the control message.

29. The apparatus of claim 28, wherein the instructions to determine the size of the resource block group mask are executable by the processor to cause the apparatus to:

identify one of a first maximum number of bits in the resource block group mask based at least in part on the radio access technology type being of a first type or a second maximum number of bits in the resource block group mask based at least in part on the radio access technology type being of a second type.

30. The apparatus of claim 29, wherein the first maximum number of bits associated with the first type of radio access technology is different from the second maximum number of bits associated with the second type of radio access technology.

* * * * *